(12) United States Patent
Ohno et al.

(10) Patent No.: US 10,339,018 B2
(45) Date of Patent: Jul. 2, 2019

(54) REDUNDANCY DEVICE, REDUNDANCY SYSTEM, AND REDUNDANCY METHOD

(71) Applicant: Yokogawa Electric Corporation, Musashino, Tokyo (JP)

(72) Inventors: Takeshi Ohno, Tokyo (JP); Nobuaki Ema, Tokyo (JP)

(73) Assignee: Yokogawa Electric Corporation, Tokyo (JP)

(*) Notice: Subject to any disclaimer, the term of this patent is extended or adjusted under 35 U.S.C. 154(b) by 206 days.

(21) Appl. No.: 15/470,976

(22) Filed: Mar. 28, 2017

(65) Prior Publication Data

US 2017/0286242 A1 Oct. 5, 2017

(30) Foreign Application Priority Data

Apr. 1, 2016 (JP) ................................. 2016-074730

(51) Int. Cl.
*G06F 11/00* (2006.01)
*G06F 11/20* (2006.01)
(Continued)

(52) U.S. Cl.
CPC ...... *G06F 11/2028* (2013.01); *G06F 11/2023* (2013.01); *G06F 11/2033* (2013.01);
(Continued)

(58) Field of Classification Search
CPC ............. G06F 11/2028; G06F 11/2023; G06F 11/2033; G06F 11/3006; G06F 11/3055; G06F 11/3419; G06F 11/2002; G06F 11/2007; G06F 11/201; G06F 11/2038; G06F 11/2041; G06F 11/3003;
(Continued)

(56) References Cited

U.S. PATENT DOCUMENTS 6,324,161 B1 * 11/2001 Kirch ................... H04L 41/0659
370/217
7,380,163 B2 * 5/2008 Davies ................ G06F 11/1456
714/12
(Continued)

FOREIGN PATENT DOCUMENTS

JP 2002123406 A 4/2002
JP 2005196467 A 7/2005
(Continued)

*Primary Examiner* — Anthony J Amoroso
(74) *Attorney, Agent, or Firm* — Sughrue Mion, PLLC

(57) ABSTRACT

A redundancy device which is configured to communicate with a redundancy opposite device and perform a redundancy execution, the redundancy device includes receivers configured to receive individually HB signals transmitted from the redundancy opposite device, a calculator configured to calculate a number of normal communication paths among communication paths of the HB signals based on a reception result of the receivers, a comparator configured to compare a calculation result of the calculator with a predetermined threshold value, and a changer configured to change the redundancy device from a standby state to an operating state, or change the redundancy device from the standby state to a not-standby state in which the redundancy execution is released, based on the calculation result of the calculator and a comparison result of the comparator.

20 Claims, 10 Drawing Sheets

(51) Int. Cl.
*H04L 12/40* (2006.01)
*H04L 12/709* (2013.01)
*H04L 29/14* (2006.01)
*G06F 11/30* (2006.01)
*G06F 11/34* (2006.01)

(52) U.S. Cl.
CPC ...... *G06F 11/3006* (2013.01); *G06F 11/3055* (2013.01); *G06F 11/3419* (2013.01); *H04L 12/40182* (2013.01); *H04L 12/40195* (2013.01); *H04L 45/245* (2013.01); *H04L 69/40* (2013.01)

(58) Field of Classification Search
CPC ................ G06F 11/34; G06F 11/3409; H04L 12/40195; H04L 12/40176; H04L 12/40182; H04L 45/245; H04L 69/40
See application file for complete search history.

(56) References Cited

U.S. PATENT DOCUMENTS

| | | | | |
|---|---|---|---|---|
| 8,006,129 | B2 * | 8/2011 | Banks | G06F 11/2028 714/10 |
| 8,108,715 | B1 * | 1/2012 | Agarwal | G06F 11/0709 714/10 |
| 8,145,837 | B2 * | 3/2012 | Ballew | G06F 11/2094 711/113 |
| 8,498,967 | B1 * | 7/2013 | Chatterjee | G06F 17/30174 707/639 |
| 9,189,316 | B2 * | 11/2015 | Butterworth | G06F 11/0772 |
| 9,658,912 | B2 * | 5/2017 | Gao | G06F 11/0757 |
| 10,102,088 | B2 * | 10/2018 | Shimodoi | H04L 43/0805 |
| 2002/0083036 | A1 * | 6/2002 | Price | G06F 11/2028 |
| 2002/0152432 | A1 * | 10/2002 | Fleming | H04L 41/0681 714/47.2 |
| 2004/0153700 | A1 * | 8/2004 | Nixon | G05B 9/03 714/4.1 |
| 2005/0050398 | A1 * | 3/2005 | Rao | G06F 11/0709 714/39 |
| 2005/0148891 | A1 | 7/2005 | Yamashita | |
| 2006/0056285 | A1 * | 3/2006 | Krajewski, III | G05B 9/03 370/216 |
| 2009/0307522 | A1 * | 12/2009 | Olson | G06F 11/2007 714/4.1 |
| 2010/0017409 | A1 * | 1/2010 | Rawat | G06F 17/30171 707/E17.007 |
| 2010/0088440 | A1 | 4/2010 | Banks et al. | |
| 2013/0227359 | A1 * | 8/2013 | Butterworth | G06F 11/0709 714/57 |
| 2017/0039118 | A1 * | 2/2017 | Shimodoi | H04L 43/0805 |

FOREIGN PATENT DOCUMENTS

| | | |
|---|---|---|
| JP | 201259193 A | 3/2012 |
| WO | 2015/098589 A1 | 7/2015 |

\* cited by examiner

EXAMPLE 1

EXAMPLE 2

EXAMPLE 3

EXAMPLE 4

REDUNDANCY DEVICE, REDUNDANCY SYSTEM, AND REDUNDANCY METHOD

BACKGROUND

Technical Fields

The disclosure relates to a redundancy device, a redundancy system, and a redundancy method.

Priority is claimed on Japanese Patent Application No. 2016-074730, filed Apr. 1, 2016, the contents of which are incorporated herein by reference.

Related Art

A redundancy system which is redundant by using two or more computers is used in order to continue work, even if a failure occurs in the system. For example, in the redundancy system 100 shown in FIG. 10, a PC1 is equipped with HB (heartbeat) transmitters 100a to 100c, and a PC2 is equipped with HB receivers 101a to 101c. In a normal state, the PC1 becomes an active side and performs a work processing, and the HB transmitters 100a to 100c transmit an HB signal to the HB receivers 101a to 101c respectively. In the normal state, the PC2 stands by (redundant) in preparation for an abnormal state of the PC1 as a standby side. At this time, the PC2 is not recognized by a destination machine at this time. If all the HB receivers 101a to 101c cannot receive the HB signal from the PC1, the PC2 determines that the PC1 has been down, and the PC2 changes to the active side and continues the work processing.

By the way, in this kind of redundancy system, for example, if the HB signal is interrupted because of a cable disconnection of the HB communication path, the PC2 changes to the active side and continues the work processing even though the PC1 has not been down, and so-called "split-brain syndrome" (hereinafter, described as "SB") may occur. If the SB occurs, identifiers such as an IP address and a MAC address may overlap in the PC1 and the PC2, and a communication with a destination computer may become unstable. Otherwise, since the destination machine falsely recognizes that the PC1 and the PC2 of which identifiers are the same are one PC, not only the PC1 and the PC2 compete for communication data transmitted from the destination machine, but also the destination machine becomes confused, and there is a possibility of having a bad influence on the whole system.

When one set of the redundant devices in the system has stopped, important functions (services) of the devices cannot be supplied to a destination machine, but the device can be recovered quickly because the stop can be detected clearly. On the other hand, if the SB occurs, the execution may be continued while the communication is unstable. In this case, the destination machine cannot determine the abnormality of the device, and incorrect information may be exchanged. Therefore, in view of the whole system, it is necessary to give a higher reliability (priority) to a measure for avoiding the SB than a measure for preventing the stop of the redundancy execution.

In order to avoid the occurrence of the SB, for example, a redundancy system equipped with a signal receiver which receives the HB signal, a reliability determiner, and a processing manager is proposed in WO2015/098589. In this system, in a case that the signal receiver cannot receive the HB signal from another computer, the reliability determiner determines a reliability of the HB communication path. If the reliability determiner determines that the reliability of the HB communication path is low, the processing manager stops under execution.

If it is determined that the reliability of the HB communication path is low, the redundancy system disclosed in WO2015/098589 stops under execution in order to avoid the SB. For this reason, if this redundancy system is used for a system which needs a continuity of work processing, such as a process control system of a plant, there is a possibility that the work processing cannot be continued.

SUMMARY

A redundancy device which is configured to communicate with a redundancy opposite device and perform a redundancy execution, the redundancy device may include receivers configured to receive individually HB signals transmitted from the redundancy opposite device, a calculator configured to calculate a number of normal communication paths among communication paths of the HB signals based on a reception result of the receivers, a comparator configured to compare a calculation result of the calculator with a predetermined threshold value, and a changer configured to change the redundancy device from a standby state to an operating state, or change the redundancy device from the standby state to a not-standby state in which the redundancy execution is released, based on the calculation result of the calculator and a comparison result of the comparator.

Further features and aspects of the present disclosure will become apparent from the following detailed description of exemplary embodiments with reference to the attached drawings.

DETAILED DESCRIPTION OF THE EMBODIMENTS

The embodiments of the present invention will be now described herein with reference to illustrative preferred embodiments. Those skilled in the art will recognize that many alternative preferred embodiments can be accomplished using the teaching of the present invention and that the present invention is not limited to the preferred embodiments illustrated herein for explanatory purposes.

An aspect of the present invention is to provide a redundancy device, a redundancy system, and a redundancy method which can prevent an occurrence of the SB without stopping under execution.

First Embodiment

Hereinafter, configuration of the redundancy system 1 in a first embodiment will be explained, with reference to FIG. 1.

Figure 1:
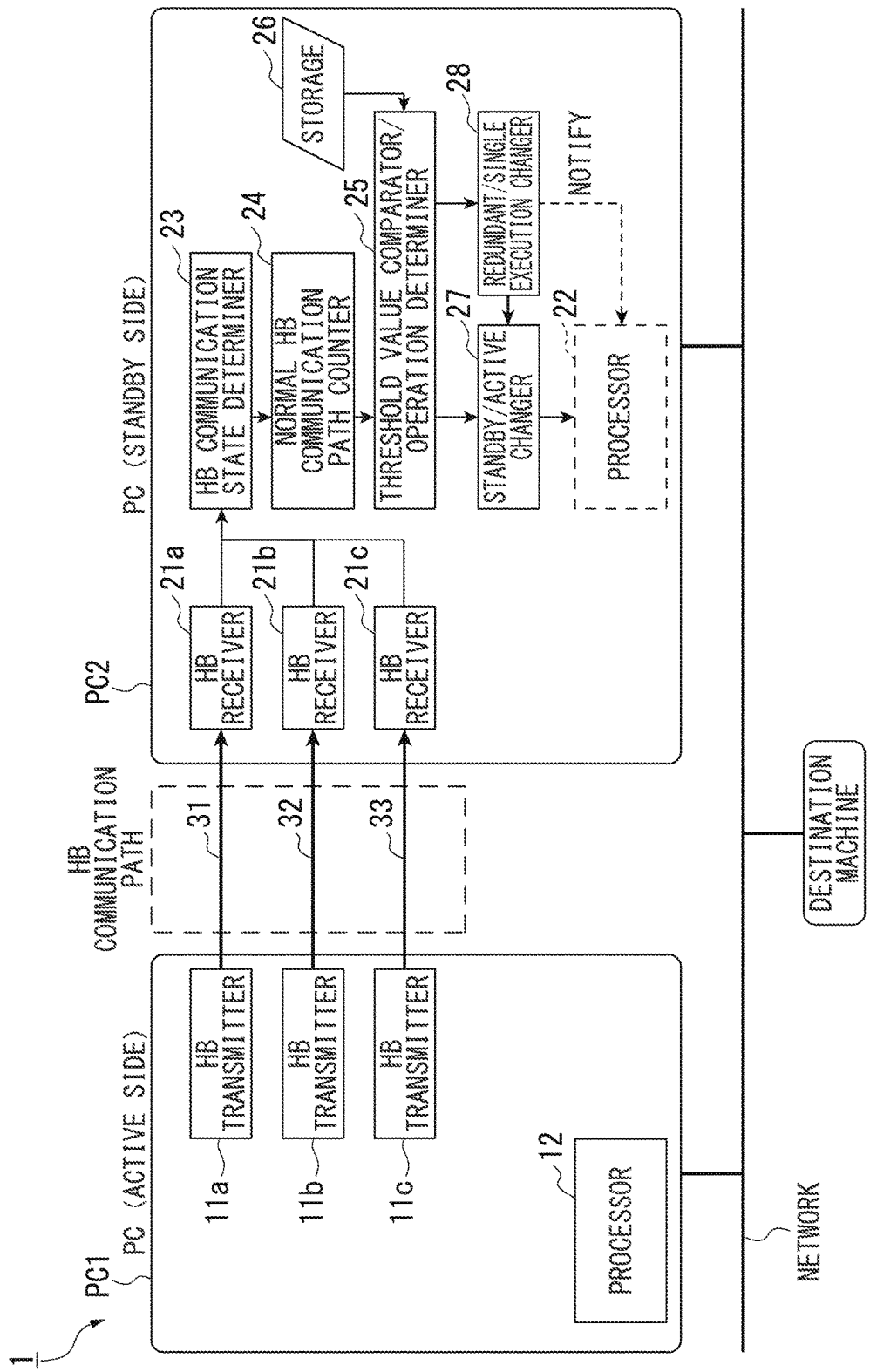
FIG. 1 is a drawing illustrating an example of configuration of the redundancy system in the first embodiment.

As shown in FIG. 1, the redundancy system 1 in the present embodiment is equipped with a computer PC1 (first device), a computer PC2 (second device), and HB communication paths 31 to 33 (communication paths). The computer PC1 is a redundancy opposite device. The computer PC2 is a redundancy device which performs redundancy execution.

For example, the PC1 and the PC2 are general purpose computers, and each of the PC1 and the PC2 is connected to a destination machine through a network.

The HB communication paths 31 to 33 connect the PC1 to the PC2, for example, by using an NIC (Network Interface Card) port for exclusive use. The HB communication paths 31 to 33 may be constituted by using a network for exclusive use (for example, L2SW).

The PC1 is in an active side (operating state) in a normal state, and the PC1 is recognized by the destination machine and provides service to the destination machine. The PC2 is in a standby side in the normal state, and the PC2 is not recognized by the destination machine and does not provide service to the destination machine.

In the normal state, the PC2 stands by (redundant) in order to be changed from the standby side to the active side if the PC1 has been down. This state is described as "standby state" in this specification. Moreover, the state where the redundancy is released is described as "not-standby state" in this specification.

When the PC2 is in the standby state, for example, in a case of Checkpoint/Restart (memory copy) method, if contents stored in a memory or a disk of the PC1 are changed, the changed part is copied in the PC2, and data of the PC2 is equalized to data of the PC1. Otherwise, in a case of Lockstep (parallel execution) method, the PC2 performs the same execution in synchronization with the execution of the PC1. However, at this time, the PC2 does not output to the destination machine. Thus, if the PC1 has been down, the PC2 changes from the standby side to the active side, and the service can be provided continuously to the destination machine.

Like the PC2, an execution of the system in a state where, if one computer has been down, another computer changes from the standby side to the active side and can continue processing is called "redundancy execution" in this specification.

On the other hand, an execution of the system in a state where, if one computer has been down, another computer cannot continue processing is called "single execution".

Hereinafter, specific configuration of each part of the redundancy system 1 will be explained.

The PC1 is equipped with HB transmitters 11a to 11c and a processor 12. Each of the HB transmitters 11a to 11c transmits a HB signal of the PC1 to the PC2 at a fixed cycle (hereinafter, described as "HB transmitting cycle"). For example, the HB transmitting cycle is about 100 [ms]. The processor 12 is equipped with a CPU, a memory, and so on, and the processor 12 provides, to the destination machine, service provided by application, OS (Operating System), or the like.

The PC2 is equipped with HB receivers 21a to 21c (receiver), a processor 22, an HB communication state determiner 23, and a normal HB communication path counter 24 (calculator), a threshold value comparator/operation determiner 25 (comparator), storage 26, a standby/active changer 27 (changer), and a redundant/single execution changer 28 (changer).

The HB receivers 21a to 21c receive individually the HB signals transmitted by the HB transmitters 11a to 11c of the PC1 through the HB communication paths 31 to 33. The HB receiver 21a wakes up from sleep at the same cycle as the HB transmitting cycle of the HB transmitter 11a, receives the HB signal transmitted from the HB transmitter 11a, and outputs a reception result to the HB communication state determiner 23. Similar to this, the HB receivers 21b and 21c outputs a reception result of the HB signals transmitted from the HB transmitters 11b and 11c respectively to the HB communication state determiner 23.

The HB communication state determiner 23 determines whether the HB communication paths 31 to 33 are normal or disconnected based on the reception result of the HB signal output from the HB receivers 21a to 21c. For example, in a case that the HB receiver 21a has not received the HB signal even though three cycles of the HB transmitting cycle in the HB transmitter 11a has passed, the HB communication state determiner 23 determines that the HB communication path 31 is disconnected. Otherwise, the HB communication state determiner 23 determines that the HB communication path 31 is normal. In a similar manner, the HB communication state determiner 23 determines whether the HB communication paths 32 and 33 are normal or disconnected. The HB communication state determiner 23 outputs the determination result to the normal HB communication path counter 24.

The normal HB communication path counter 24 counts a number of the HB communication paths which have been determined as normal by the HB communication state determiner 23 (hereinafter, described as "number of normal HB communication paths"). Timings when each of the HB receivers 21a to 21c receives each HB signal are not always matched, and the HB communication state determiner 23 determines whether normal or disconnected every time the HB communication state determiner 23 receives each HB signal. Therefore, the normal HB communication path counter 24 holds a determination result obtained by the HB communication state determiner 23 during the HB transmitting cycle, and the normal HB communication path counter 24 counts the number of normal HB communication paths.

The storage 26 stores a predetermined threshold value. The threshold value is determined in accordance with a number of HB communication paths, which can permit simultaneous occurrence of failure. For example, as shown in FIG. 1, a case where the number of the HB communication paths is three and the threshold value is set as two will be explained. In a case where all of the three HB communication paths are normal, even if failures occur simultaneously in two HB communication paths of the three, there is one normal HB communication path. For this reason, the PC2 can recognize the HB signal of the PC1. Therefore, an occurrence of the SB, in which the PC2 becomes the active side even though the PC1 has not been down, can be avoided. In this case, since a maximum number of the HB communication paths which can permit simultaneous occurrence of failure is two, two or less positive integral value can be set as the threshold value.

On the other hand, for example, in a case where the number of the HB communication paths is four, if a number of failures which occurred simultaneously in the HB communication paths is three or less, an occurrence of the SB can be avoided. That is, a maximum number of the HB communication paths which can permit simultaneous occurrence of failure is three. In this case, three or less positive integral value can be set as the threshold value.

Although details will be described later, the threshold value is used when determining whether to change (failover) the PC2 from the standby state to the not-standby state or not.

The threshold value comparator/operation determiner 25 compares a newest number of normal HB communication paths (calculation result) held by the normal HB communication path counter 24 with the threshold value stored in the storage 26, and the threshold value comparator/operation determiner 25 gives instructions to the redundant/single execution changer 28 and the standby/active changer 27 based on the comparison result.

The standby/active changer 27 changes the PC2 from the standby side to the active side based on the instructions from the threshold value comparator/operation determiner 25.

The redundant/single execution changer 28 changes the PC2 from the standby state to the not-standby state based on the instructions from the threshold value comparator/operation determiner 25. Thereby, the redundancy system 1 changes from the redundancy execution to the single execution. After changing to the single execution, the PC2 does not become the active side even though the number of normal HB communication paths becomes zero.

The standby/active changer 27 and the redundant/single execution changer 28 may be the same components.

The above-described execution of the redundancy system 1 in the present embodiment will be explained by using the flow chart shown in FIG. 2.

In an initial state, the PC1 is in the active side, the PC2 is in the standby side (standby state), and the redundancy system 1 performs the redundancy execution (Step S1).

Next, the HB communication state determiner 23 determines whether each of the HB communication paths 31 to 33 is normal or disconnected (Step S2).

Next, the normal HB communication path counter 24 counts the number of normal HB communication paths, and the normal HB communication path counter 24 holds the counted result (Step S3).

Next, the threshold value comparator/operation determiner 25 compares the number of normal HB communication paths with the threshold value (Step S4). As a result of the comparison, if the number of normal HB communication paths is larger than the threshold value, the standby state of the PC2 is continued, and processing is returned to Step S2.

As a result of the comparison in Step S4, if the number of normal HB communication paths is larger than or equal to one and smaller than or equal to the threshold value, the threshold value comparator/operation determiner 25 changes the redundancy system 1 from the redundancy execution to the single execution by driving the redundant/single execution changer 28 in order to change the PC2 from the standby state to the not-standby state (Step S5). Thereby, the single execution in which the PC1 is in the active side is performed (Step S6), and an occurrence of the SB can be avoided even though, thereafter, failures of which number exceeds the threshold value occur in the HB communication path.

As a result of the comparison of Step S4, if the number of normal HB communication paths is 0 (zero), since it is thought that the PC1 has been down, the threshold value comparator/operation determiner 25 drives the standby/active changer 27 in order to change the PC2 from the standby side to the active side (operating state) (Step S7). Thereby, the single execution in which the PC2 is in the active side is performed (Step S8).

Effects of the redundancy system 1 in the present embodiment will be explained by comparing the redundancy system 1 with the conventional redundancy system 100 shown in FIG. 10.

Figure 10:
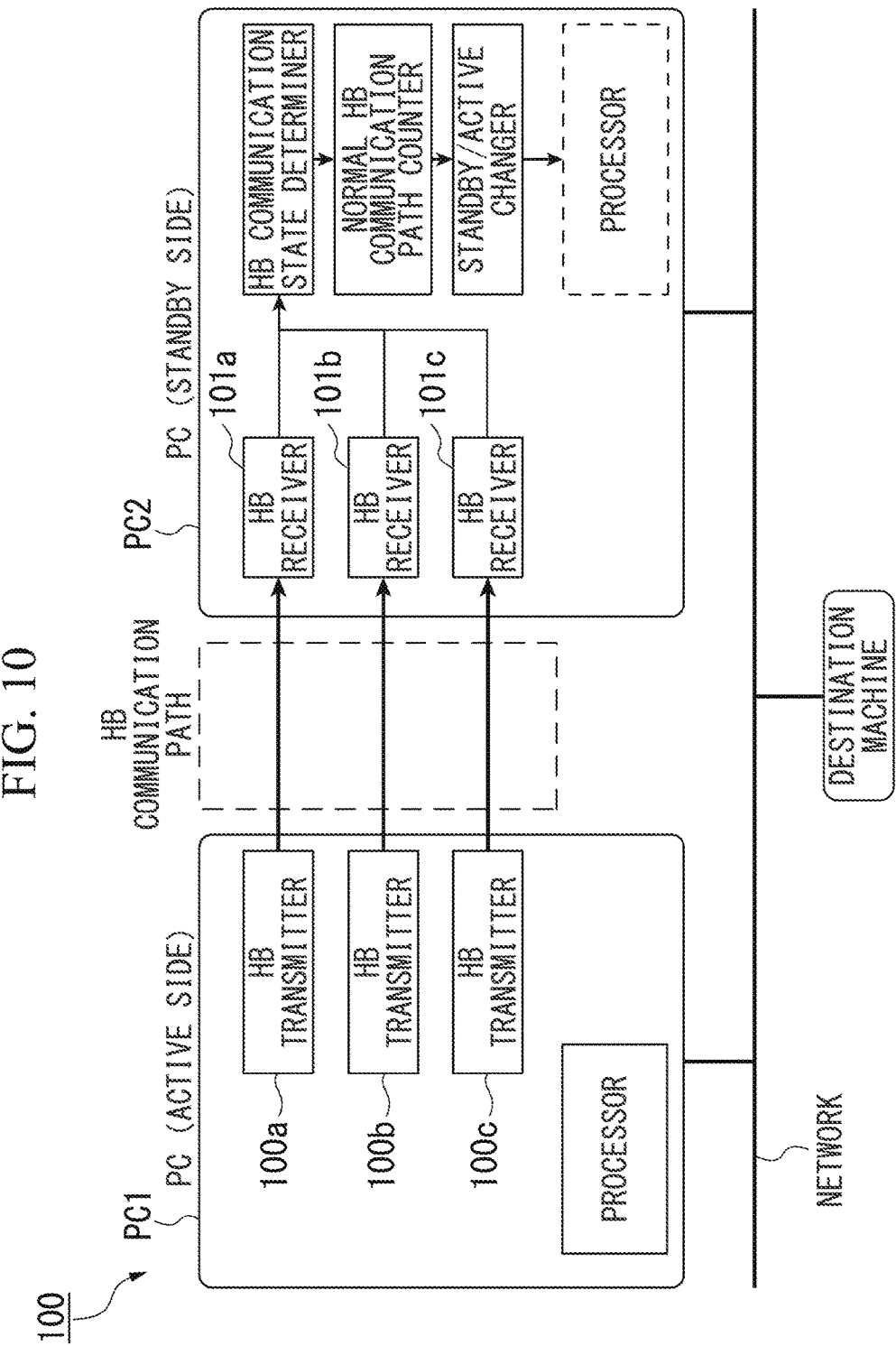
FIG. 10 is a drawing illustrating an example of configuration of the conventional redundancy system.

If the number of normal HB communication paths becomes 0, the conventional redundancy system 100 shown in FIG. 10 determines that the PC1 has been down, and changes the PC2 to the active side. On the other hand, if the number of normal HB communication paths is one or more, the redundancy system 100 determines that the PC1 has not down, and continues the redundancy execution. In this case, for example, the redundancy execution is continued even if the number of normal HB communication paths is one. For this reason, if a failure occurs in the HB communication path in this state, there is a possibility that the PC2 changes to the active side even though the PC1 has not been down, and the SB occurs.

On the other hand, in the redundancy system 1 of the present embodiment, the normal HB communication path counter 24 monitors the number of normal HB communication paths. If the number of normal HB communication paths has changed, the redundancy system 1 determines whether to continue the redundancy execution or change to the single execution by comparing the number of normal HB communication paths with the threshold value. For example, in a case that the threshold value is set as two, the redundancy system 1 changes (degenerates) from the redundancy execution to the single execution if the number of normal HB communication paths becomes two or less. For this reason, an occurrence of the SB can be avoided even if failures occur simultaneously in two HB communication paths thereafter.

It is desirable that a value which is larger than or equal to one and smaller than the number of HB communication paths is set as the threshold value. If the threshold value is set to be large, a reliability of avoiding the SB in the redundancy system 1 can be improved.

For example, in a process control system used for a plant, like feedback control, processing data of a previous cycle may be used for inputting in a next processing cycle. In this case, it is required that the processing data of the previous cycle should be reflected on the processing in the next processing cycle without data loss. When the computer in the standby side changes to the active side and continues processing because the computer in the active side has been down, in order to prevent loss of the processing data, it is required to change the computer in the standby state from the standby side to the active side in a control cycle (in other words, real-time property is required).

The redundancy system 1 of the present embodiment can achieve the real-time property. For example, in a case that the HB transmitting cycle is 100 [ms], time required for the HB communication state determiner 23 to determine whether the HB communication paths 31 to 33 are normal or disconnected is 300 [ms] if it is three cycles of the HB transmitting cycle. Time required for the normal HB communication path counter 24 to count the number of normal HB communication paths, time required for the threshold value comparator/operation determiner 25 to compare the number of normal HB communication paths with the threshold value, and time required for the standby/active changer 27 to change the PC2 from the standby side to the active side are 1 [ms] or less respectively. Therefore, time required for the series of these executions is about 300 [ms].

Even if the control cycle of the process control system of the plant is about 1 second, since the time required for the series of the executions is shorter enough than the control cycle, the real-time property can be achieved. For example, even if the PC1 has been down, the processing data loss can be prevented by changing the PC2 from the standby side to the active side in the control cycle.

Since the number of HB communication paths which can permit simultaneous occurrence of failure can be increased by setting the threshold value as a larger value, the redundancy system 1 of which reliability of avoiding the SB is more improved can be provided.

The PC2 may be equipped with a notifier which notifies, to the PC1, information about the HB communication path which has been disconnected by using the other HB communication path when the disconnection of the HB communication path has been detected. The frequency of changing to the single execution can be reduced by restoring the HB communication path which has been disconnected based on the information notified from the notifier before the number of normal HB communication paths becomes smaller than or equal to the threshold value.

Second Embodiment

Next, although a second embodiment of the present invention will be explained, fundamental configuration of the second embodiment is the same as that of the first embodiment. For this reason, parts that correspond to those in the first embodiment are assigned the same reference numerals, and the descriptions thereof will be omitted.

In the present embodiment, configuration of the HB communication path differs from that of the first embodiment.

Figure 3:
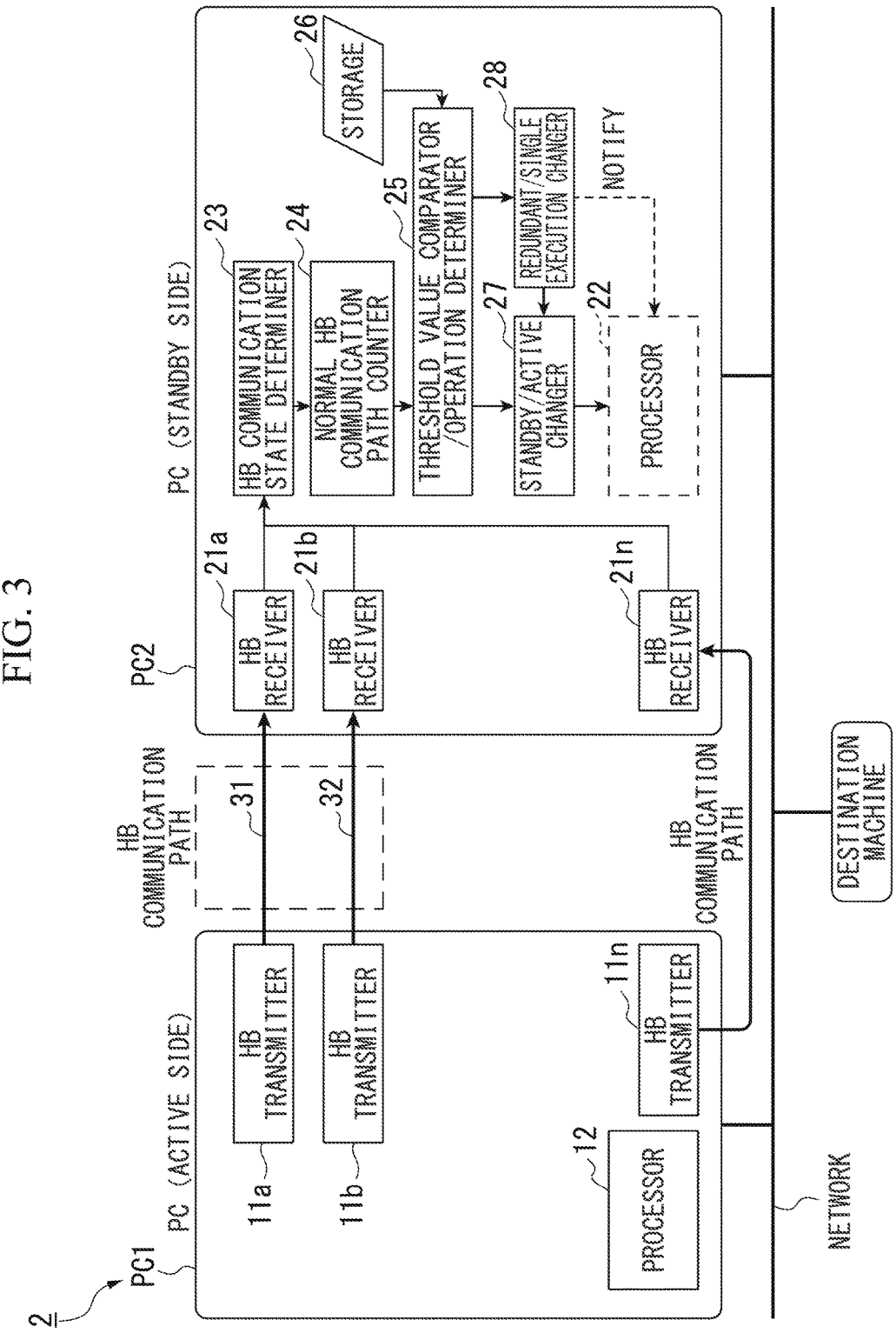
FIG. 3 is a drawing illustrating an example of configuration of the redundancy system in the second embodiment.

A redundancy system 2 in the second embodiment will be explained by using FIG. 3. As shown in FIG. 3, the PC1 in the redundancy system 2 is equipped with an HB transmitter 11$n$. The HB transmitter 11$n$ transmits the HB signal of the PC1 to the PC2 at a fixed cycle like the HB transmitters 11$a$, 11$b$, and 11$c$.

The PC2 in the redundancy system 2 is equipped with an HB receiver 21$n$. The HB receiver 21$n$ receives the HB signal transmitted from the HB transmitter 11$n$ of the PC1 through an existing NIC and an existing network (for example, L2SW) for application.

The HB communication path does not need special network specification, and does not need to describe information in a data section of an HB packet. Therefore, as described above, the existing device can be used for communication between the HB transmitter 11$n$ and the HB receiver 21$n$.

Third Embodiment

Next, although a third embodiment of the present invention will be explained, fundamental configuration of the third embodiment is the same as that of the first embodiment. For this reason, parts that correspond to those in the first embodiment are assigned the same reference numerals, and the descriptions thereof will be omitted.

In the first embodiment, the HB communication paths 31 to 33 are independent of each other. In other words, the HB communication paths 31 to 33 do not share the NIC and the network device, and the HB communication paths 31 to 33 are independent physically. Thus, in a case that the HB communication paths are independent of each other, a failure and a human error occurred in the HB communication path do not affect the other HB communication paths.

On the other hand, when actually constructing the HB communication paths, the HB communication paths may share one network switch. In this case, communication of the HB communication paths may stop because of a failure of the network switch or a human error of turning off power supply of the network switch mistakenly. Thus, if two or more HB communication paths are disconnected because of a failure of one switch or the like, it is described in this specification that two or more HB communication paths have "relation of failure". In other words, the "relation of failure" represents a relationship of the HB communication paths in a case where two or more HB communication paths share a network device and become disconnected simultaneously because of a failure of the network device or a human error.

In the third embodiment, two or more HB communication paths which have the "relation of failure" are included in the redundancy system.

The redundancy system 3 of the third embodiment will be explained by using FIG. 4. The HB transmitters 11$a$ to 11$d$ in the PC1 transmit an HB signal to the HB receivers 21$a$ to 21$d$ in the PC2 through the HB communication paths 41 to 44 respectively. Although the HB communication path 41 and the HB communication path 44 are independent from the other HB communication paths, the HB communication paths 42 and 43 are relayed by a common SW. The SW is a switch, such as L2SW and L3SW. If a failure occurs in the SW, the HB communication paths 42 and 43 stop simultaneously. Therefore, the HB communication paths 42 and 43 have the "relation of failure".

Although the redundancy system 3 has the four HB communication paths 41 to 44, all the HB communication paths 41 to 44 stop when three failures (a failure of the HB communication path 41, a failure of the SW, and a failure of the HB communication path 44) has occurred. Thus, a number of the substantially normal communication paths equivalent to a number of independent normal HB communication paths will be described as "number of effective HB communication paths". For example, the number of effective HB communication paths of the redundancy system 3 is three.

Figure 4:
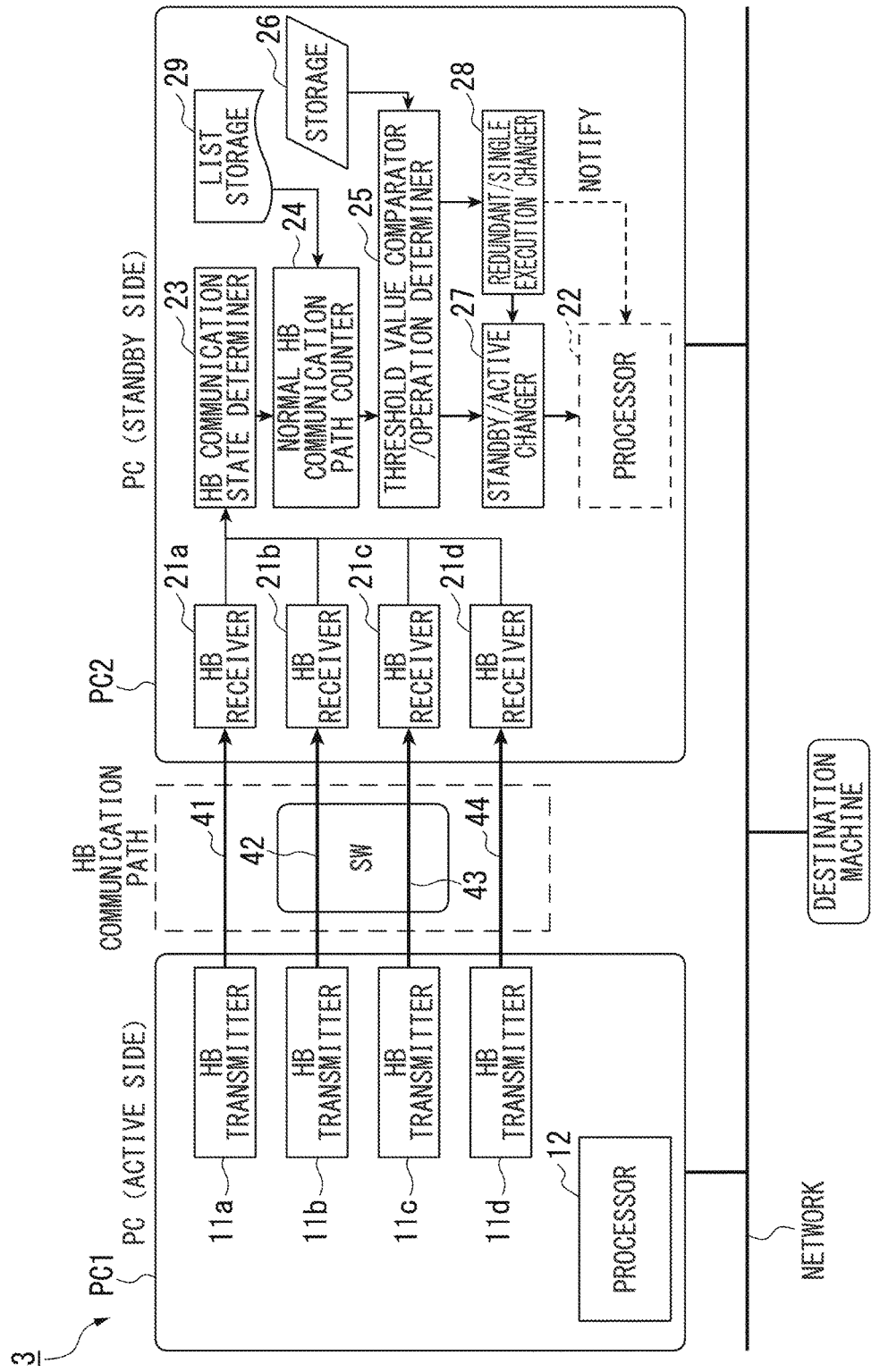
FIG. 4 is a drawing illustrating an example of configuration of the redundancy system in the third embodiment.

As shown in FIG. 4, the PC2 in the redundancy system 3 is equipped with list storage 29. The list storage 29 stores an effective HB communication path list (list information) which is information about the relation of failure. The effective HB communication path list will be explained by using Table 1.

As shown in Table 1, an existence of the relation of failure about each of the HB communication paths 41 to 44 and a supposed type of failure (occurrence position) are described in the effective HB communication path list. For example, a failure of the HB communication path 41 is supposed to occur in the HB communication path 41, and a failure of the HB communication paths 42 and 43 are supposed to occur in the SW. Although it is also considered that failures of the HB communication paths 42 and 43 occur separately not in the SW but in each HB communication path, the failure which occurs separately in each HB communication path is included in the failure of the SW in which the HB communication paths 42 and 43 stop simultaneously. In a case of the inclusion relation, a condition (worst case) in which a range of disconnection caused by failure is large is described in the effective HB communication path list. In an example shown in Table 1, the effective HB communication paths No. 1 to No. 3 are described, and the HB communication paths 42 and 43 are included in the effective HB communication path No. 2.

paths is two even though the number of normal HB communication paths is one. In this case, the number of normal HB communication paths (=1) is set to the number of normal effective HB communication paths.

The threshold value comparator/operation determiner 25 compares the number of normal effective HB communication paths and the threshold value. The threshold value is set based on the number of effective HB communication paths. Instructions given to the standby/active changer 27 and the redundant/single execution changer 28 based on the comparison result obtained by the threshold value comparator/

TABLE 1

EFFECTIVE HB COMMUNICATION PATH LIST IN HB COMMUNICATION PATH SHOWN IN FIG. 4

| EFFECTIVE HB COMMUNICATION PATH | | TYPE OF FAILURE (OCCURRENCE POSITION) | RELATED COMMUNICATION PATH | HB41 | | HB42 | | HB43 | | HB44 | |
|---|---|---|---|---|---|---|---|---|---|---|---|
| | | | | OK/ | | OK/ | | OK/ | | RE- | OK/ |
| No | OK/NG | | | RELATION | NG | RELATION | NG | RELATION | NG | LATION | NG |
| 1 | | IN PATH HB41 | HB41 | YES | | NO | — | NO | — | NO | — |
| 2 | | SW | HB42 HB43 | NO | — | YES | | YES | | NO | — |
| 3 | | IN PATH HB44 | HB44 | NO | — | NO | — | NO | — | YES | |

In terms of an action of the redundancy system 3 configured as described above, a point which is different from the first embodiment will be explained.

The normal HB communication path counter 24 counts a number of normal effective HB communication paths with reference to the effective HB communication path list (Table 1) stored in the list storage 29. Specifically, the normal HB communication path counter 24 determines whether each of the HB communication paths 41 to 44 are normal or disconnected at this time, and the normal HB communication path counter 24 describes the determination result in an OK/NG field of a corresponding HB communication path in the effective HB communication path list. Based on the result, the normal HB communication path counter 24 determines whether the effective HB communication paths No. 1 to No. 3 are normal or disconnected, describes the determination result in the corresponding OK/NG field, and counts a number of the effective HB communication paths determined to be normal.

At this time, if the effective HB communication path includes one or more normal HB communication paths, it is determined that the effective HB communication path is normal. For example, in an example shown in Table 1, if at least one of the HB communication paths 42 and 43 is normal, it is determined that the effective HB communication path No. 2 is normal. If both of the HB communication paths 42 and 43 are disconnected, it is determined that the effective HB communication path No. 2 is disconnected. That is, the number of normal effective HB communication paths is a number of effective HB communication paths each of which include one or more normal HB communication paths in the effective HB communication path list. However, in a case that the number of normal effective HB communication paths exceeds the number of normal HB communication paths, the number of normal HB communication paths is set to the number of normal effective HB communication paths. For example, in an example shown in FIG. 5C, in a case that only the HB communication path 53b is normal, the number of normal effective HB communication operation determiner 25 are the same as that of the first embodiment.

The redundancy system 3 of the present embodiment can collect communication paths relevant to a certain failure, and can use them as one independent communication path (effective HB communication path).

In an example shown in FIG. 4, although the number of HB communication paths is four, the number of effective HB communication paths is three because the HB communication paths 42 and 43 share the SW. Here, in a case that the threshold value is set as two, when two effective HB communication paths among three effective HB communication paths stop simultaneously, the PC2 operates in order to avoid an occurrence of the SB (the PC2 shifts from "standby state" to "not-standby state").

In a case that three effective HB communication paths are normal, the PC2 continues the redundancy execution. However, for example, if the HB communication path 41 and the SW have been disconnected, two effective HB communication paths become disconnected simultaneously (in a state where it becomes equal to the threshold value=2), and the PC2 shifts to "not-standby state" (it changes to the single execution).

By this operation, even if a failure has occurred in the HB communication path 44 thereafter, the PC2 does not shift to the active side, and the SB can be avoided. Here, a modified example of the effective HB communication path list will be explained by using FIG. 5A to FIG. 5D and Table 2 to Table 5.

Figure 5A:
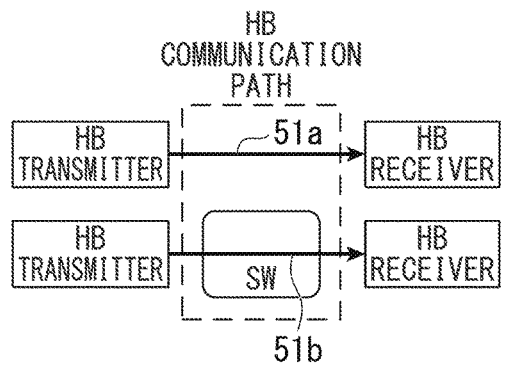
FIG. 5A is a drawing illustrating an example of configuration of the HB communication path in the third embodiment.

As shown in FIG. 5A, in the HB communication path of the example 1, the SW is contained in the HB communication path 51b, but the HB communication path 51b and the HB communication path 51a are independent of each other. Therefore, there is no relation of failure between the HB communication path 51a and the HB communication path 51b. In this case, as shown in the effective HB communication path list shown in Table 2, the number of HB communication paths is the same as the number of effective HB communication paths, and each number is two.

TABLE 2

EFFECTIVE HB COMMUNICATION PATH LIST IN HB COMMUNICATION PATH SHOWN IN EXAMPLE 1

| EFFECTIVE HB COMMUNICATION PATH | | TYPE OF FAILURE (OCCURRENCE POSITION) | RELATED COMMUNICATION PATH | HB51a | | HB51b | |
|---|---|---|---|---|---|---|---|
| No | OK/NG | | | RELATION | OK/NG | RELATION | OK/NG |
| 1 | | IN PATH HB51a | HB51a | YES | | NO | — |
| 2 | | IN PATH HB51b | HB51b | NO | — | YES | |

Figure 5B:
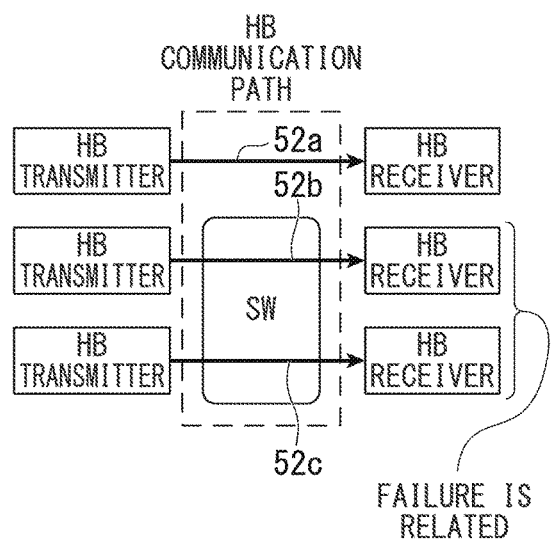
FIG. 5B is a drawing illustrating an example of configuration of the HB communication path in the third embodiment.

As shown in FIG. 5B, in the HB communication path of the example 2, the HB communication path 52a is independent, but the HB communication paths 52b and 52c share one SW. If a failure occurs in the SW, the HB communication paths 52b and 52c are disconnected simultaneously. For this reason, these HB communication paths 52b and 52c have a relation of failure. In this case, as shown in the effective HB communication path list shown in Table 3, the number of HB communication paths is three, but the number of effective HB communication paths is two.

Figure 5C:
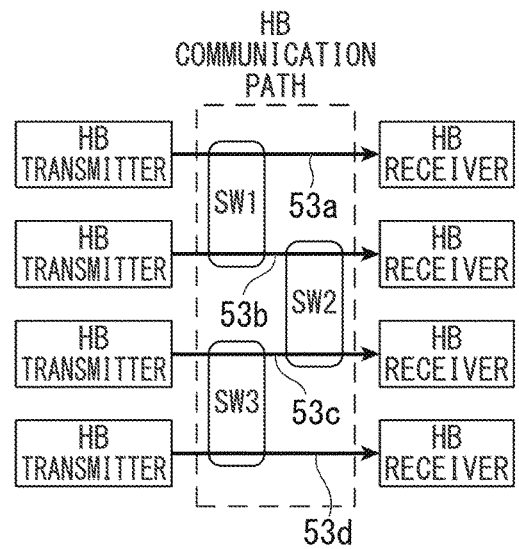
FIG. 5C is a drawing illustrating an example of configuration of the HB communication path in the third embodiment.
Figure 5D:
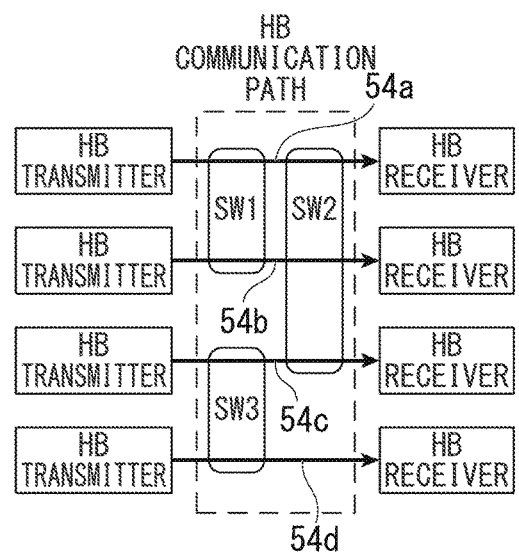
FIG. 5D is a drawing illustrating an example of configuration of the HB communication path in the third embodiment.

As shown in FIG. 5D, in the HB communication path of the example 4, the HB communication paths 54a and 54b share the SW1, the HB communication paths 54a, 54b, and 54c share the SW2, and the HB communication paths 54c and 54d share the SW3. For this reason, a failure in which the SW1 is broken and the HB communication paths 54a and 54b are disconnected simultaneously is included in a failure in which the SW2 is broken and the HB communication paths 54a, 54b, and 54c are disconnected simultaneously. In

TABLE 3

EFFECTIVE HB COMMUNICATION PATH LIST IN HB COMMUNICATION PATH SHOWN IN EXAMPLE 2

| EFFECTIVE HB COMMUNICATION PATH | | TYPE OF FAILURE (OCCURRENCE POSITION) | RELATED COMMUNICATION PATH | HB52a | | HB52b | | HB52c | |
|---|---|---|---|---|---|---|---|---|---|
| No | OK/NG | | | RELATION | OK/NG | RELATION | OK/NG | RELATION | OK/NG |
| 1 | | IN PATH HB52a | HB52a | YES | | NO | — | NO | — |
| 2 | | SW (SHARED COMPONENT) | HB52b HB52c | NO | — | YES | | YES | |

As shown in FIG. 5C, in the HB communication path of the example 3, the HB communication paths 53a and 53b share the SW1, the HB communication paths 53b and 53c share the SW2, and the HB communication paths 53c and 53d share the SW3. For this reason, if a failure occurs in the SW1, the HB communication paths 53a and 53b are disconnected simultaneously. If a failure occurs in the SW2, the HB communication paths 53b and 53c are disconnected simultaneously. If a failure occurs in SW3, the HB communication paths 53c and 53d are disconnected simultaneously. In this case, like the effective HB communication path list shown in Table 4, the number of effective HB communication paths is three.

this case, as shown in the effective HB communication path list shown in Table 5, the failure in which the SW1 is broken and the HB communication paths 54a and 54b are disconnected simultaneously is not described, the number of effective HB communication paths is two. Thus, in a case that the number of effective HB communication paths is only two, since the SB does not occur even if an abnormality occurs in the SW2 or the SW3, the threshold value is set as one. Thereby, for example, since the number of effective HB communication paths is one (=the threshold value) if an abnormality occurs in the SW2 or the SW3, the PC2 shifts to "not-standby state" (it changes to the single execution).

TABLE 4

EFFECTIVE HB COMMUNICATION PATH LIST IN HB COMMUNICATION PATH SHOWN IN EXAMPLE 3

| EFFECTIVE HB COMMUNICATION PATH | | TYPE OF FAILURE (OCCURRENCE POSITION) | RELATED COMMUNICATION PATH | HB53a | | HB53b | | HB53c | | HB53d | |
|---|---|---|---|---|---|---|---|---|---|---|---|
| No | OK/NG | | | RELATION | OK/NG | RELATION | OK/NG | RELATION | OK/NG | RELATION | OK/NG |
| 1 | | SW1 | HB53a HB53b | YES | | YES | | NO | — | NO | — |
| 2 | | SW2 | HB53b HB53c | NO | — | YES | | YES | | NO | — |
| 3 | | SW3 | HB53c HB53d | NO | — | NO | — | YES | | YES | |

By this operation, even if a failure of the SW which has remained thereafter occurs, the PC2 does not shift to the active side, and the SB can be avoided.

Thereby, for example, even if an HB communication path has been disconnected because of a failure of a switch, pulling-out or cutting of a cable, or the like, and the number of normal HB communication paths has become temporarily smaller than or equal to the threshold value, and the redundancy system has changed to the single execution, if the disconnected path is recovered thereafter and the number of normal HB communication paths exceeds the threshold value, the redundancy execution of the system can be recovered automatically.

TABLE 5

EFFECTIVE HB COMMUNICATION PATH LIST IN HB COMMUNICATION PATH SHOWN IN EXAMPLE 4

| EFFECTIVE HB COMMUNICATION PATH No | OK/NG | TYPE OF FAILURE (OCCURRENCE POSITION) | RELATED COMMUNICATION PATH | HB54a RELATION | HB54a OK/OK/NG | HB54b RE-LATION | HB54b OK/NG | HB54c RELATION | HB54c OK/NG | HB54d RE-LATION | HB54d OK/NG |
|---|---|---|---|---|---|---|---|---|---|---|---|
| 1 | | SW2 | HB54a HB54b HB54c | YES | | YES | | YES | | NO | — |
| 2 | | SW3 | HB54c HB54d | NO | — | NO | — | YES | | YES | |

Fourth Embodiment

Next, a fourth embodiment of the present invention will be explained, but fundamental configuration of the fourth embodiment is the same as that of the first embodiment. For this reason, parts that correspond to those in the first embodiment are assigned the same reference numerals, and the descriptions thereof will be omitted.

In the first embodiment, when the number of normal HB communication paths has become smaller than or equal to the threshold value, the PC2 changes from the standby state to the not-standby state, and the redundancy system 1 changes (degenerates) to the single execution, in order to avoid an occurrence of the SB.

In the fourth embodiment, the redundancy system can be automatically recovered from the single execution to the redundancy execution.

Figure 6:
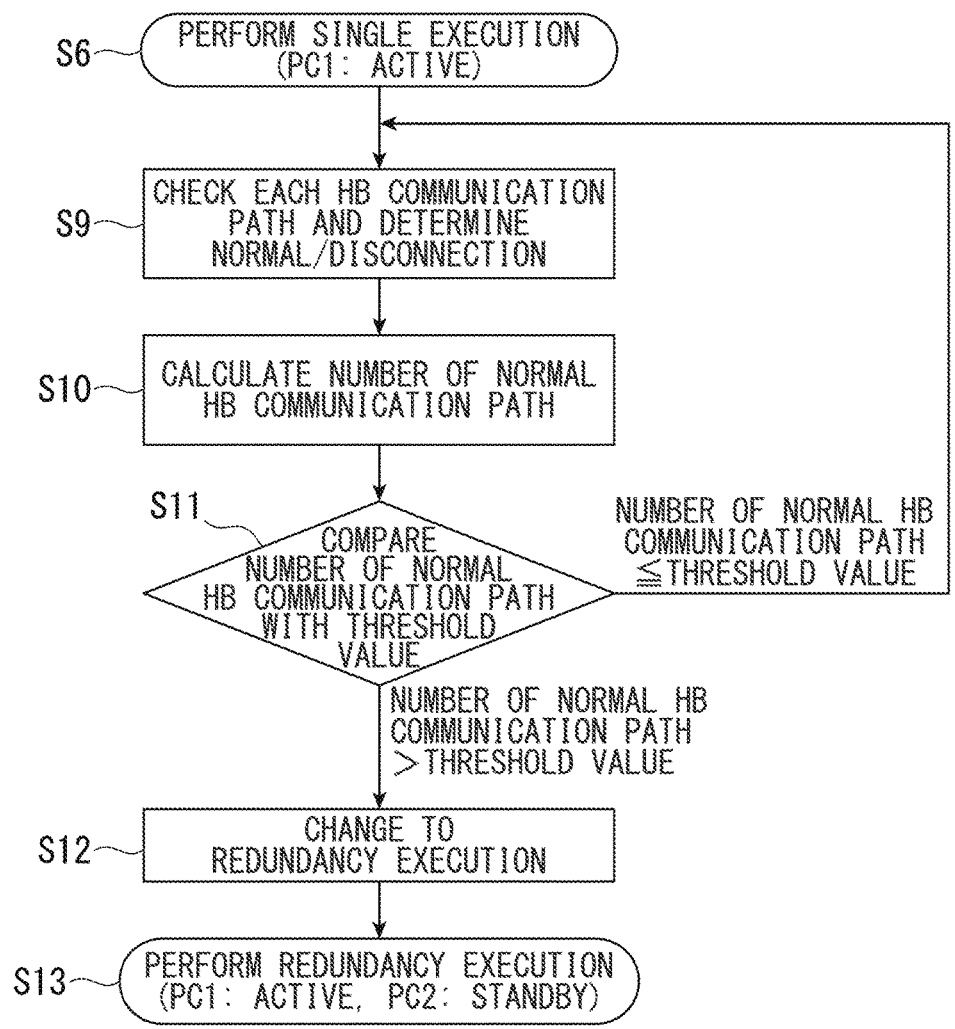
FIG. 6 is a flow chart illustrating an example of execution of the redundancy system in the fourth embodiment.

Execution of the redundancy system in the fourth embodiment will be explained by using the flow chart shown in FIG. 6.

Figure 2:
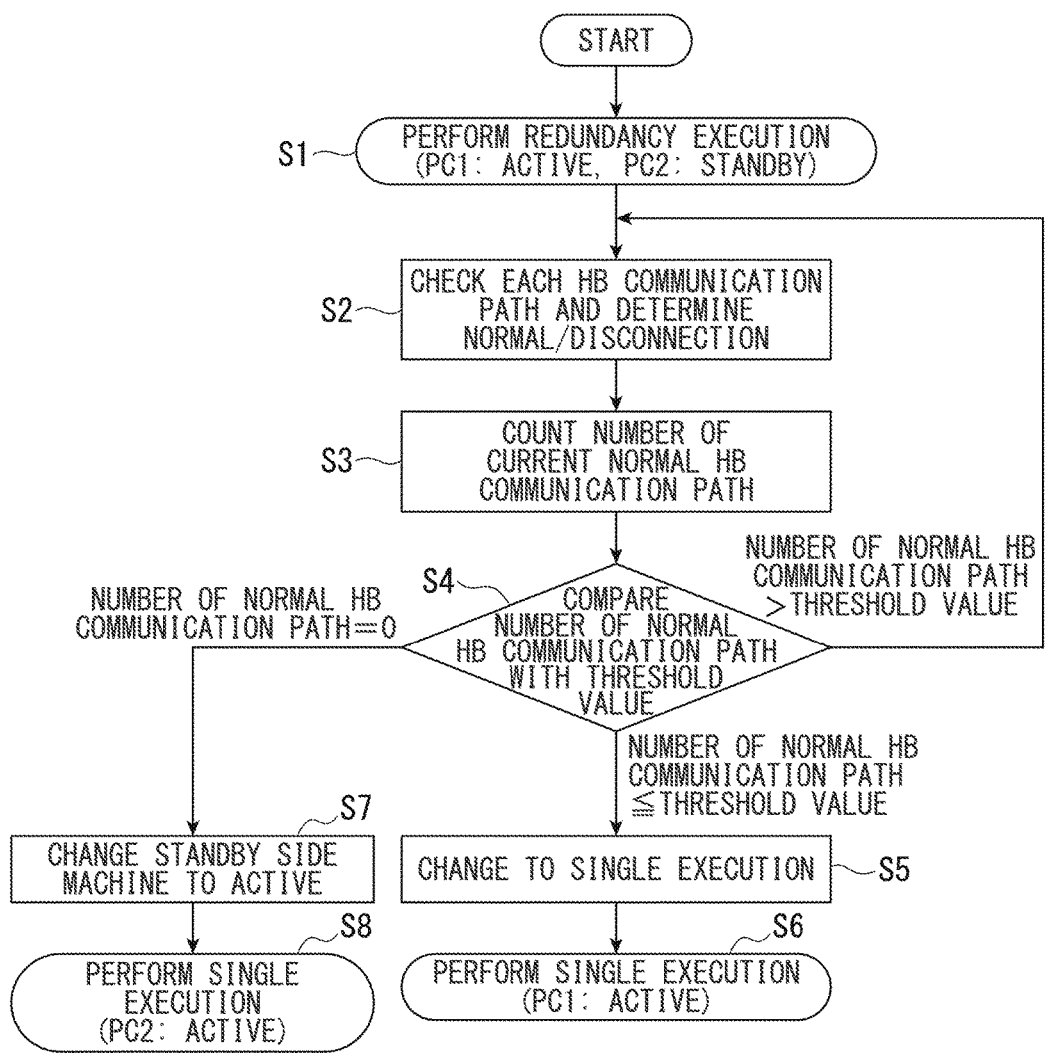
FIG. 2 is a flow chart illustrating an example of execution of the redundancy system in the first embodiment.

Since executions performed before Step S6 are the same as the executions of Step S1 to S6 of the first embodiment shown in FIG. 2, the explanation thereof will be omitted.

In the fourth embodiment, after the PC2 has changed from the standby state to the not-standby state in Step S6 and single execution has been performed, the HB communication state determiner 23 continues to determine whether the HB communication paths 31 to 33 are normal or disconnected, and the HB communication state determiner 23 grasps normal HB communication paths and disconnected HB communication paths (Step S9).

The normal HB communication path counter 24 counts the number of normal HB communication paths (Step S10).

Next, the threshold value comparator/operation determiner 25 compares the number of normal HB communication paths with the threshold value (Step S11). As a result of comparison, if the number of normal HB communication paths is smaller than or equal to the threshold value, the processing returns to Step S9. As a result of comparison, if the number of normal HB communication paths is larger than the threshold value, the threshold value comparator/operation determiner 25 drives the redundant/single execution changer 28 in order to change the PC2 from the not-standby state to the standby state. Thereby, the redundancy system 1 changes from the single execution to the redundancy execution (Step S12), and the redundancy execution is performed (Step S13).

After the PC2 has changed to the not-standby state in Step S6, the PC2 continues to equalize data in the PC2 to the data in the PC1. Thereby, if the number of HB communication paths exceeds the threshold value, the redundancy execution of the system can be recovered quickly.

The present embodiment and the third embodiment may be combined, in order to automatically change the redundancy system 3 from the single execution to the redundancy execution by comparing the number of effective HB communication paths with the threshold value.

Fifth Embodiment

Next, although a fifth embodiment of the present invention will be explained, fundamental configuration of the fifth embodiment is the same as that of the first embodiment. For this reason, parts that correspond to those in the first embodiment are assigned the same reference numerals, and the descriptions thereof will be omitted.

In the first embodiment, the PC2 includes components for implementing a degeneration function of the threshold value comparator/operation determiner 25. However, the PC1 is equipped with these components in the fifth embodiment. In a case that the PC1 has been down, if the PC1 is recovered after the redundancy system has performed the single execution where the PC2 is in the active side, the redundancy execution is recovered automatically.

Figure 7:
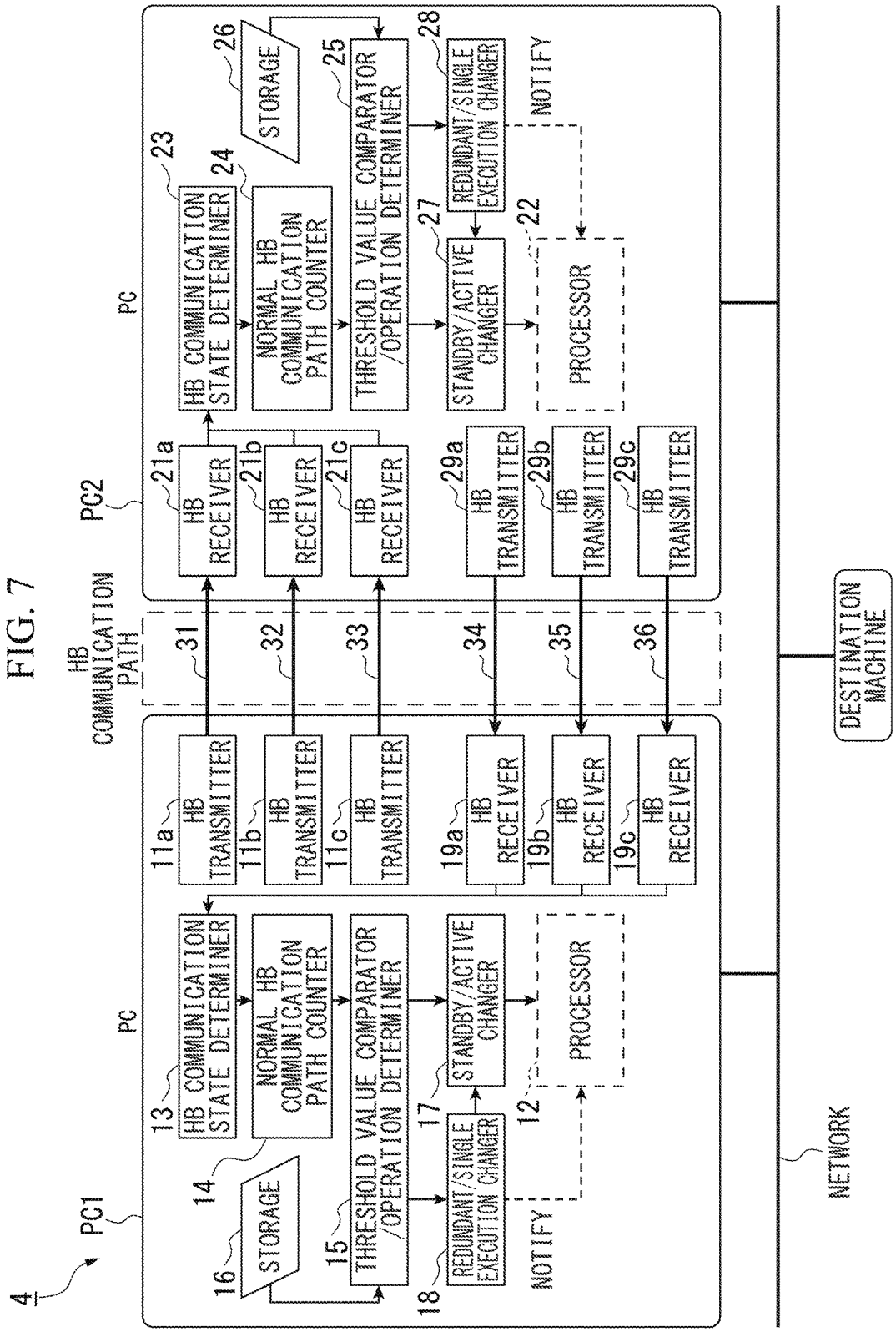
FIG. 7 is a drawing illustrating an example of configuration of the redundancy system in the fifth embodiment.

As shown in FIG. 7, the PC1 in the redundancy system 4 of the present embodiment is equipped with HB receivers 19a to 19c, an HB communication state determiner 13, a normal HB communication path counter 14, a threshold value comparator/operation determiner 15, storage 16, a standby/active changer 17, and a redundant/single execution changer 18. Since executions of these components are the same as those of the PC2, detailed explanation will be omitted.

The redundancy system 4 is equipped with HB communication paths 34 to 36. The HB communication paths 34 to 36 transmit the HB signal transmitted by the HB transmitters 29a to 29c in the PC2 to the HB receivers 19a to 19c in the PC1, respectively.

In addition, the HB communication paths 31 and 34 may be physically the same path, the HB communication paths 32 and 35 may be physically the same path, and the HB communication paths 33 and 36 may be physically the same path. In this case, the HB transmitter 11a and the HB receiver 19a may be configured as an HB transceiver, the HB transmitter 11b and the HB receiver 19b may be configured as an HB transceiver, and the HB transmitter 11c and the HB receiver 19c may be configured as an HB transceiver.

Figure 8:
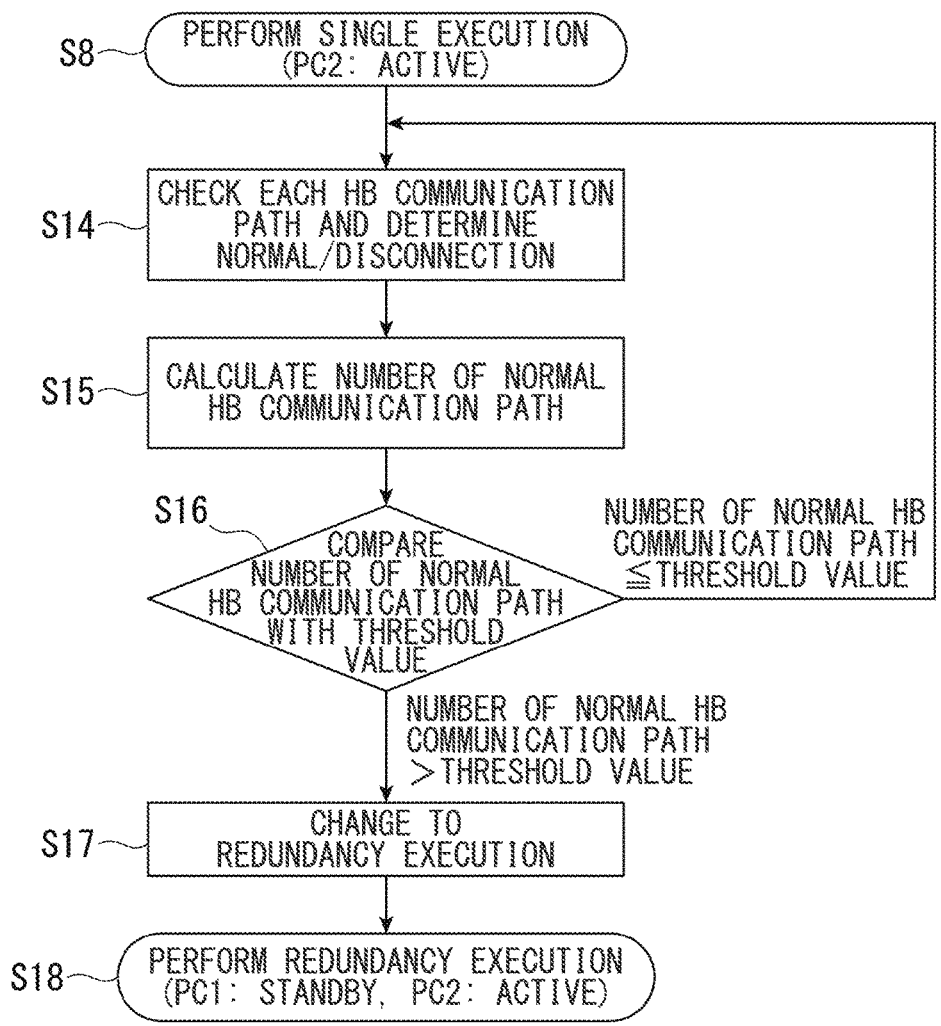
FIG. 8 is a flow chart illustrating an example of execution of the redundancy system in the fifth embodiment.

An action of the redundancy system 4 of the present embodiment will be explained by using the flow chart shown in FIG. 8. Since executions performed before Step S8 is the same as the executions of Step S1 to S4, S7 and S8 of the first embodiment shown in FIG. 2, the explanation thereof will be omitted.

After the PC2 has performed the single execution of the active side (Step S8), the HB communication state determiner 13 of the PC1 determines whether the HB communication paths 34 to 36 are normal or disconnected (Step S14).

Next, the normal HB communication path counter 14 counts the number of normal HB communication paths among the HB communication paths 34 to 36 (Step S15).

Next, the threshold value comparator/operation determiner 15 compares the number of normal HB communication paths with the threshold value stored in the storage 16 (Step S16). As a result of comparison, if the number of normal HB communication paths is smaller than or equal to the threshold value, the processing returns to Step S14. As a result of comparison, if the number of normal HB communication paths is larger than the threshold value, the threshold value comparator/operation determiner 15 outputs, to redundant/single execution changer 18, instructions for changing the PC1 from the not-standby state to the standby state. The redundant/single execution changer 18 changes the redundancy system 4 from the single execution to the redundancy execution in accordance with the instructions from the threshold value comparator/operation determiner 15 (Step S17). Thereby, the redundancy execution of the redundancy system 4 where the PC2 is in the active side and the PC1 is in the standby side is recovered automatically (Step S18).

In this way, for example, if the PC1 is recovered after the PC1 has been down and the PC2 has become the active side, the redundancy system 4 can be automatically changed from the single execution to the redundancy execution.

Sixth Embodiment

Next, a sixth embodiment of the present invention will be explained. In the first embodiment to the fifth embodiment, the duplicated execution of the two PCs was explained. However, in the present embodiment, a triplicated execution of the three PCs was explained.

Figure 9:
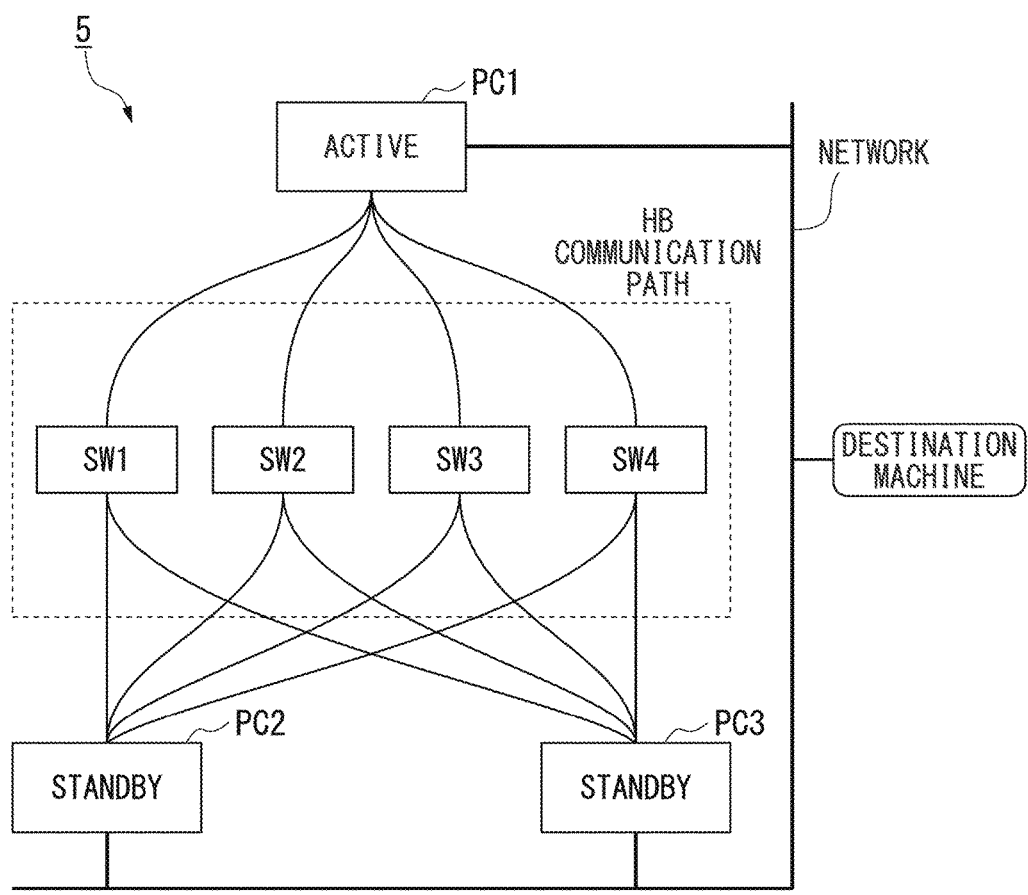
FIG. 9 is a drawing illustrating an example of configuration of the redundancy system in the sixth embodiment.

As shown in FIG. 9, the redundancy system 5 of the present embodiment is equipped with a PC1 which is in the active side, and a PC2 and a PC3 (third device) which are in the standby side. The PC1 of the present embodiment is equipped with the same configuration as the PC1 (refer to FIG. 7) shown in the fifth embodiment, and the PC1 transmits HB signals to the PC2 and the PC3, and receives HB signals from the PC2 and the PC3. Like this, the PC2 transmits HB signals to the PC1 and the PC3, and receives HB signals from the PC1 and the PC3. The PC3 transmits HB signals to the PC1 and the PC2, and receives HB signals from the PC1 and the PC2. Each of the PC1 to PC3 counts the number of normal HB communication paths to the two other PCs in accordance with the same steps as the flow chart shown in FIG. 2, and each of the PC1 to PC3 compares the number of normal HB communication paths with the threshold value. Thereby, the redundancy/single execution can be changed, and the standby/active can be changed.

In an example shown in FIG. 9, the number of HB communication paths between the PC1 and the PC2 is four, the number of HB communication paths between the PC1 and the PC3 is four, and the number of HB communication paths between the PC2 and the PC3 is four. Each of the HB communication paths is relayed by each SW 1 to SW4. Thus, the redundancy system 5 is triplicated and operated. The number of PCs in the standby side may be three or more.

In a case that the threshold value between the PC1 and the PC2, the threshold value between the PC1 and the PC3, and the threshold value between the PC2 and the PC3 are set as three, if there are four or more normal HB communication paths between the PCs, the triplicated execution is continued. Even if abnormalities of three (the threshold value) HB communication paths occur simultaneously in this state, one or more normal HB communication paths remain. For this reason, a live state of the PC1 in the active side can be checked through the normal path. If it degenerates (shifts to the single execution) in this condition, an occurrence of the SB can be avoided.

In the first embodiment to the fifth embodiment, it is described as "degeneration" that the redundancy system changes from the redundancy execution to the single execution. However, "degeneration" in the present embodiment also includes a change from the triplicated execution to the duplicated execution.

For example, as shown in FIG. 9, in a case that the triplicated execution is performed by the three PCs, each of the PC2 and the PC3 checks the HB signal from the PC1. For example, if the number of normal HB communication paths between the PC1 and the PC2, which has been checked by the PC2, is larger than or equal to one and smaller than or equal to the threshold value, the PC2 changes from the standby state to the not-standby state. On the other hand, if the number of normal HB communication paths between the PC1 and the PC3, which has been checked by the PC3, is larger than the threshold value, the PC3 continues the standby state. As a result, the triplicated execution is degenerated to the duplicated execution. The threshold value of the PC2 and the threshold value of the PC3 may be different from each other.

In a case that each of the PC1 to the PC3 is equipped with the configuration shown in the fifth embodiment of the present invention (refer to FIG. 7), it can be automatically recovered from the duplicated execution to the triplicated execution.

For example, in a case that the number of normal HB communication paths between PC1 and PC2 has become smaller than or equal to the threshold value, the PC2 has changed from the standby state to the not-standby state, thereafter the PC1 has been broken, and the PC3 has changed to the active side, the redundancy system 5 generally performs the single execution of only the PC3.

At this time, if the number of normal HB communication paths between the PC2 which has been in the not-standby state and the PC3 which has become the active side is larger than the threshold value, the PC2 is changed to the standby state, and the redundancy execution by the PC2 and the PC3 is performed.

Thereby, even if multiplex failures such as a loss of the number of normal HB communication paths between the PC1 and the PC2 and a failure of the PC1 occurs, the redundancy system 5 can be prevented from changing to the single execution, can continue the redundancy execution by the PC2 and the PC3, and can maintain reliability of the whole system.

As described above, in the redundancy system 5 of the sixth embodiment, even if a PC in the active side among three or more PCs has changed, each PC automatically changes to the not-standby state or the standby state with reference to the threshold value set between the each PC and the active side PC. Thereby, the redundancy system 5 of the sixth embodiment can perform the redundancy execution automatically (change actively) in a number of PCs corresponding to the condition.

In a case that the redundancy is performed by using two or more PCs in the standby side like the redundancy system 5, the HB receivers and the HB transmitters of each PC may be common components. For example, in a case that the PC1 to the PC3 use one common HB receiver, an HB communicator may have a function of determining a PC which has transmitted the HB signal based on a transmission source address included in each HB packet of the PC1 to the PC3, which has been received by the common HB receiver. In a case that the PC1 to the PC3 use one common HB transmitter, this common HB transmitter may be connected to each PC by an HB communication path branched through an SW or the like.

For example, the first embodiment to the sixth embodiment and the modified examples thereof are applicable to a process control system of a plant using controller and gateway, as shown in https://www.yokogawa.co.jp/rd/pdf/tr/rd-tr-r05402-005.pdf.

In this kind of process control system, high reliability and real-time property are required. However, if two or more PCs perform the redundancy execution while applying each of the above-described embodiments, the requirement can be satisfied.

The concept of the present invention will be described below in an organized way.

In a redundancy system equipped with redundancy devices, if a failure occurs in a part of the redundancy devices, another device (for example, destination machine) can grasp the occurrence of failure, and can also take measures. On the other hand, if the SB occurs in a redundancy device, since another device cannot detect the abnormality of the redundancy device, there is a possibility that the other device uses incorrect data caused by instability of communication. For this reason, in view of the whole system, avoiding the SB is more important than avoiding a failure of the redundancy device.

The basic concept of the present invention is to degenerate (stop the redundancy execution, and change to the single execution) and to avoid the SB, in return for at least one (effective) HB communication path of the redundant device (in other words, a redundancy execution possible condition is slightly reduced).

A concept of the threshold value has been proposed in order to appropriately set the condition of degeneration in accordance with the configuration of the redundancy device (for example, the number of HB communication paths).

A concept of the number of effective HB communication paths has been proposed in consideration of a case where a single failure point (relation of failure) exists in two or more HB communication paths.

Means and method for restoring a redundancy device which has degenerated once to the redundancy execution has been proposed.

Method for maintaining reliability and avoiding the SB by actively changing the number of PCs which perform the redundancy execution in accordance with a situation of the HB communication path which connects the PCs, in the redundancy device configured by two or more PCs, has been proposed.

Although it is desirable that the probability of the SB is low, if an SB occurrence probability is set to be lower than a probability that the system changes from the redundancy execution to the single execution, the redundancy execution which is a cause of the SB can be stopped before the SB occurs. Therefore, in a process control system of a plant which requires high reliability, configuration of the redundancy system (the number of PCs, the number of HB communication paths, the threshold value, and so on) is determined so that the SB occurrence probability can be lower than the probability that the system changes from the redundancy execution to the single execution.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiments of the present invention have been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

What is claimed is:

1. A redundancy device which is configured to communicate with a redundancy opposite device and perform a redundancy execution, the redundancy device comprising:
   receivers configured to receive individually HB signals transmitted from the redundancy opposite device;
   a calculator configured to calculate a number of normal communication paths among communication paths of the HB signals based on a reception result of the receivers;
   a comparator configured to compare a calculation result of the calculator with a predetermined threshold value; and
   a changer configured to change the redundancy device from a standby state to an operating state, or change the redundancy device from the standby state to a not-standby state in which the redundancy execution is released, based on the calculation result of the calculator and a comparison result of the comparator.

2. The redundancy device according to claim 1,
wherein the threshold value is larger than or equal to one, and smaller than a number of communication paths of the HB signals.

3. The redundancy device according to claim 1,
wherein the changer is configured to:
change the redundancy device from the standby state to the operating state if the calculation result of the calculator is zero, and
change the redundancy device from the standby state to the not-standby state if the calculation result of the calculator is larger than or equal to one, and smaller than or equal to the threshold value.

4. The redundancy device according to claim 3,
wherein the standby state is continued if the calculation result of the calculator is larger than the threshold value.

5. The redundancy device according to claim 3,
wherein the changer is configured to change the redundancy device from the not-standby state to the standby state if the calculation result of the calculator becomes larger than the threshold value after changing the redundancy device from the standby state to the not-standby state.

6. The redundancy device according to claim 1, further comprising:
a storage which stores list information representing a relation of failure about communication paths of the HB signals.

7. The redundancy device according to claim 6,
wherein the calculator is configured to calculate a number of substantially normal communication paths among the communication paths of the HB signals with reference to the list information stored in the storage.

8. A redundancy system comprising:
a first device; and
a second device which is configured to communicate with the first device and perform a redundancy execution,
wherein the second device comprising:
receivers configured to receive individually HB signals transmitted from the first device;
a calculator configured to calculate a number of normal communication paths among communication paths of the HB signals based on a reception result of the receivers;
a comparator configured to compare a calculation result of the calculator with a predetermined threshold value; and
a changer configured to change the second device from a standby state to an operating state, or change the second from the standby state to a not-standby state in which the redundancy execution is released, based on the calculation result of the calculator and a comparison result of the comparator.

9. The redundancy system according to claim 8,
wherein the threshold value is larger than or equal to one, and smaller than a number of communication paths of the HB signals.

10. The redundancy system according to claim 8,
wherein the changer is configured to:
change the second device from the standby state to the operating state if the calculation result of the calculator is zero, and
change the second device from the standby state to the not-standby state if the calculation result of the calculator is larger than or equal to one, and smaller than or equal to the threshold value.

11. The redundancy system according to claim 10,
wherein the standby state is continued if the calculation result of the calculator is larger than the threshold value.

12. The redundancy system according to claim 10,
wherein the changer is configured to change the second device from the not-standby state to the standby state if the calculation result of the calculator becomes larger than the threshold value after changing the second device from the standby state to the not-standby state.

13. The redundancy system according to claim 8, further comprising:
a storage which stores list information representing a relation of failure about communication paths of the HB signals.

14. The redundancy system according to claim 13,
wherein the calculator is configured to calculate a number of substantially normal communication paths among the communication paths of the HB signals with reference to the list information stored in the storage.

15. The redundancy system according to claim 8, further comprising:
a third device which is configured to communicate with the first device and the second device, and perform a redundancy execution,
wherein the second device is configured to continue the not-standby state or the standby state, or change from the not-standby state to the standby state, based on a reception result of HB signals transmitted from the third device.

16. A redundancy method for a redundancy system which comprises a first device and a second device which is configured to communicate with the first device and perform a redundancy execution, the redundancy method comprising:
receiving, by the second device, individually HB signals transmitted from the first device;
calculating a number of normal communication paths among communication paths of the HB signals based on a reception result of the HB signals;
comparing a calculation result of the number of normal communication paths with a predetermined threshold value; and
changing the second device from a standby state to an operating state, or changing the second device from the standby state to a not-standby state in which the redundancy execution is released, based on the calculation result and a comparison result.

17. The redundancy method according to claim 16,
wherein the threshold value is larger than or equal to one, and smaller than a number of communication paths of the HB signals.

18. The redundancy method according to claim 16, further comprising:
changing the second device from the standby state to the operating state if the calculation result is zero; and
changing the second device from the standby state to the not-standby state if the calculation result is larger than or equal to one, and smaller than or equal to the threshold value.

19. The redundancy method according to claim 18, further comprising:
continuing the standby state if the calculation result is larger than the threshold value.

20. The redundancy method according to claim 16, further comprising:

changing the second device from the not-standby state to the standby state if the calculation result becomes larger than the threshold value after changing the second device from the standby state to the not-standby state.

* * * * *